United States Patent Office

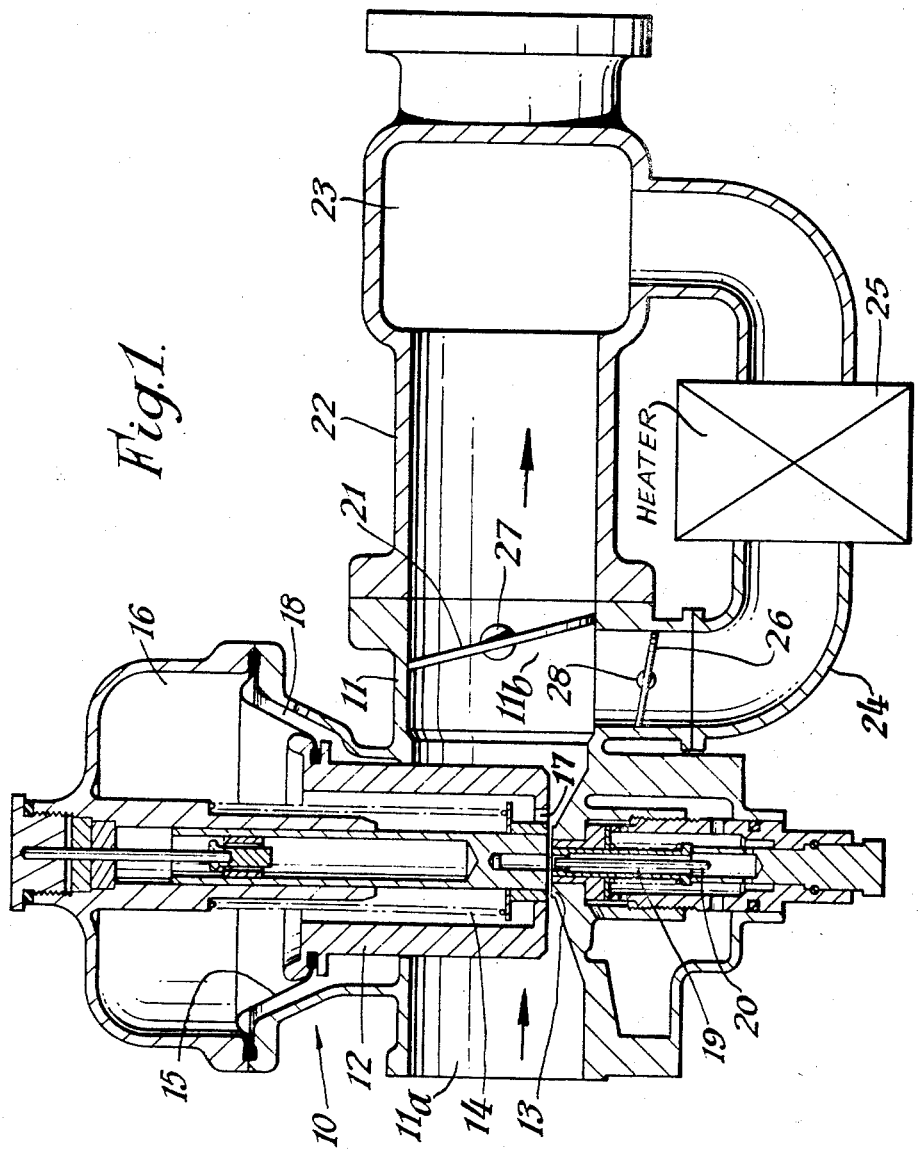

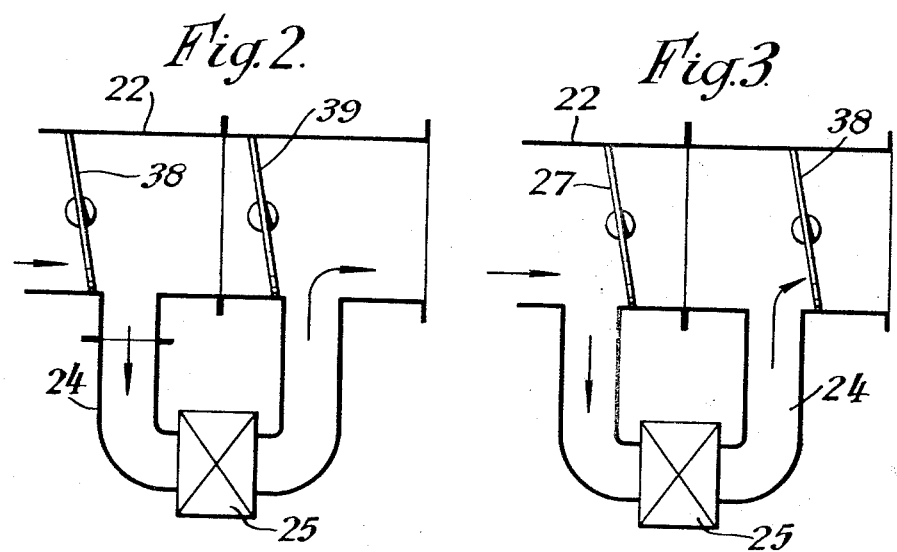
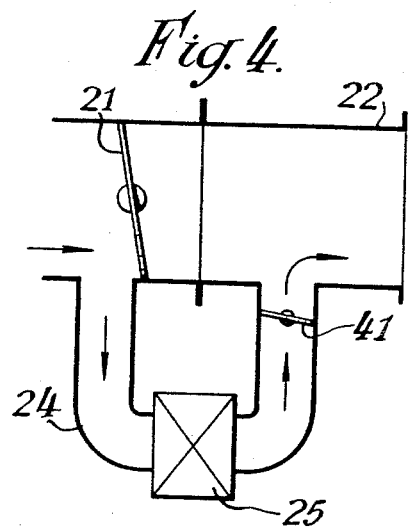

3,444,848
Patented May 20, 1969

3,444,848
FUEL-AIR MIXTURE INTAKE SYSTEMS FOR
INTERNAL COMBUSTION ENGINES
Geoffrey L. Lawrence, Stanmore, England, assignor to
The Zenith Carburetter Company Limited, Stanmore,
England
Filed Dec. 7, 1966, Ser. No. 599,874
Claims priority, application Great Britain, Dec. 15, 1965,
53,251/65
Int. Cl. F02m 3/04, 17/00, 15/02
U.S. Cl. 123—122                                    12 Claims

ABSTRACT OF THE DISCLOSURE

A fuel-air mixture supply and intake system for an internal combustion engine comprising an air valve carburetter and primary and secondary induction conduit systems for the passage of fuel/air mixture from the carburetter to the engine cylinders, the flow in the said conduit systems being controlled by two throttle valves interconnected to provide progressive opening of the primary induction conduit system to a predetermined degree before opening of the secondary induction conduit system commences.

---

This invention relates to fuel-air mixture supply and intake systems for internal combustion engines, and has for its object to provide an improved fuel-air mixture supply and intake system which greatly reduces the quantity of noxious gases in the exhaust effluent of the engine as compared with conventional systems, and improves fuel consumption and the running conditions of the engine.

By "fuel-air mixture supply and intake systems" we mean the arrangements of charge-forming devices, conduits, throttle valves and other parts by means of which the mixture of fuel and air is created and distributed to the engine cylinders, and by which the quantity of such mixture is controlled.

Internal combustion engines for propelling vehicles, as at present used, conventionally have fuel requirement characteristics such that a substantially richer mixture is required for idling and light load, slow speed running than for high speed running, but the fuel in the relatively rich mixture is not fully burned, resulting in emission of carbon monoxide and unburned hydrocarbons which produce atmospheric pollution.

When an internal combustion engine is operated under accelerating conditions, a large proportion of the fuel enters the intake system in unvapourised form and this liquid fuel tends to be deposited upon the internal surfaces of the inlet conduits between the carburetter or carburetters which constitutes the charge-forming device and the inlet valves. Upon subsequent reduction in throttle opening to a cruising or over-run condition, when the engine is acting as a brake to resist the motion of the vehicle, the depression in the intake system rises as the air fuel requirement of the engine decreases, causing deposited fuel to be picked up and entrained in the induced charge and creating greatly increased fuel-air ratio in the induced charge, until the liquid fuel deposited in the intake system has been exhausted.

Furthermore, during sudden accelerations the reverse effect occurs to that described above and liquid fuel is deposited on the internal surfaces of the mixture inlet system, the said liquid fuel being distributed to the individual cylinders in quantities not proportional to the air flow. Thus one or more cylinders are fed with excessively rich mixture whilst others are fed with over-lean mixture. Both over-rich mixtures and over-lean mixtures produce high emission of noxious exhaust constituents; in the first case through incomplete combustion of all the fuel; and in the second case by irregular or sluggish combustion during successive cycles resulting in incomplete utilisation of the fuel supplied.

According to the present invention, a mixture supply and intake system for an internal combustion engine comprises a charge forming device having a suction-actuated air valve mounted in the induction passage of said charge forming device and adapted to maintain an effective suction in the mixing chamber thereof in all operating conditions, and fuel control means which vary the fuel supply with the air flow, a primary induction conduit system and a secondary conduit system both receiving fuel/air mixture from the said charge forming device, primary throttle valve means for controlling said primary induction conduit system, secondary throttle valve means for controlling said secondary induction conduit system, and means for opening in succession the said primary and secondary throttle valve means.

Further, according to the invention, a mixture supply and intake system for an internal combustion engine comprises a charge forming device having a suction-actuated air valve mounted in the induction passage of said charge-forming device and adapted to maintain an effective suction in the mixing chamber thereof in all operating conditions, and fuel control means which vary the fuel supply with the air flow, a primary induction conduit system for the passage of fuel/air mixture from the carburetter to the inlet port or ports of the engine cylinder or cylinders, a secondary induction conduit system constituting a by-pass permitting the flow of fuel/air mixture from the carburetter to the inlet port or ports of the engine cylinder or cylinders without passing through at least a part of the primary conduit system, primary throttle valve means for controlling said primary induction conduit system and secondary throttle valve means for controlling said secondary induction conduit system, means being provided for opening in succession said primary and secondary throttle valve means.

Preferably, the primary induction conduit system includes conduits of smaller total cross sectional area than the conduits of the secondary induction conduit system, which conduits of smaller cross-section are by-passed by the said secondary induction conduit system.

The primary and secondary throttle valves means may be linked together with lost motion to provide the successive opening thereof in such a way that the primary throttle valve means opens first and the secondary throttle valve means commences to open when the primary throttle valve means is sufficiently fully open not to restrict the flow therethrough.

The definition "an air valve carburetter" means a charge forming device consisting of a carburetter having a suction actuated air valve which is mounted in the induction passage of the carburetter adapted to maintain an effective suction in the mixing chamber of the carburetter in all operating conditions, and fuel control means which vary the fuel supply with the air flow.

It has been found that modifications can be made to internal combustion engines, for example to the ignition timing to provide fuel requirement characteristics such that a fuel-air mixture of substantially constant proportions can be used from idling to cruise conditions, but tests have shown that, with conventional induction systems, difficulties arise which prevent this ideal from being achieved. The provision of a conduit system of relatively small cross-section to convey the mixture to the engine cylinders at idling speeds and above contributes to the improved mixture distribution, but it has been found that only in combination with an air valve carburetter will the use of the primary and secondary conduit systems readily provide the accurate and consistent matching of the fuel-air mixture to the engine requirements which is necessary to provide satisfactory operation of the engine at all speeds and under all conditions.

The reasons for this are as follows. With a fixed choke carburetter, a pilot fuel supply system is employed for idling and slow speed running, because at low air flows the depression signal obtained is insufficient to produce fuel flow from a discharge upstream of the throttle, without causing undue restriction at high air flows. Thus in the conventional carburetters, there is a changeover at some point in the speed range between supply from the pilot system and supply from the main discharge, which is difficult to effect without temporarily deviating from the chosen fuel-air ratio, and, when fuel commences to flow from the main discharge it flows in a random fashion until the flow is fully established, giving a non-consistent fuel-air ratio and a non-progressive fuel-air ratio change with increasing air flow. The lack of progressive ratio change is due to the conventional method of using progression holes which pass from the upper to the lower side of the throttle as the latter opens. This alters the fuel-air ratio in steps which, from the point of view of running quality of the engine are acceptable with the normally used fuel-air ratios, but which produce relatively high emission of carbon monoxide and unburned hydrocarbons, and do not provide satisfactory running quality with a basically weak mixture. An air-valve carburetter, on the other hand, may have no separate idling system and no progression holes, but meters the fuel continuously from one jet system. Further, by having a mixing chamber in which an effective suction is maintained under all operating conditions, an air valve carburetter can be so arranged that a jet system is operative throughout the full range of speeds and loads of the engine whereby a consistent and progressive fuel-air ratio control may be achieved.

A fixed choke carburreter frequently has an accelerating pump to provide enrichment of the mixture under certain operating conditions. It is well known that an acceleration pump provides fuel considerably in excess of that required under most operating conditions, and that the correct timing of the acceleration pump charge in relation to engine requirements is very difficult to achieve. An air-valve carburetter can usually be used without an acceleration pump, or with an acceleration pump of very small capacity, and is advantageous also in this respect.

The invention is hereinafter described with reference to the accompanying drawings, in which:

FIGURE 1 is a sectional elevation showing an air valve carburetter and two conduit systems connecting it to the cylinders of an internal combustion engine;

FIGURES 2, 3 and 4 show modified arrangements of the conduit systems and of throttle valves controlling the flow of fuel-air mixture in those conduit systems;

Figure 5:
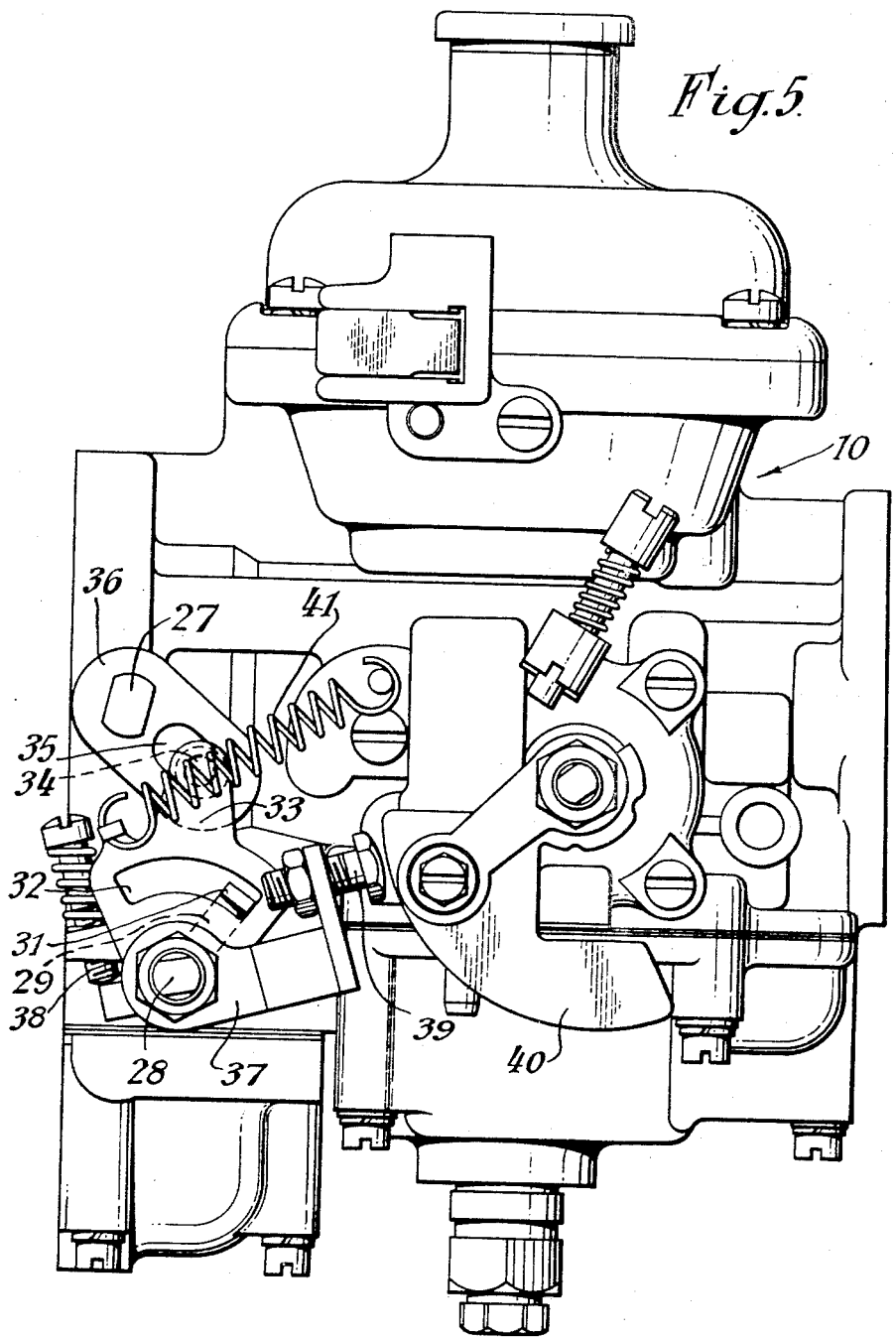
FIGURE 5 is a view in elevation of the carburetter shown in FIGURE 1, showing a control linkage for the throttle valves of the said carburetter.

Referring to the drawings, and particularly to FIGURE 1 thereof, an air-valve carburetter is shown generally at 10, the mixture passage 11 thereof having an air inlet at 11a and having slidably mounted in it an air valve 12 co-operating with a fixed bridge 13 to determine the rate of flow of air through the said passage. The air valve 12 is urged by a light spring 14 towards the bridge 13, and is coupled to a diaphragm 15 the upper side of which is exposed in a chamber 16 connected through an orifice 17 to the induction passage on the downstream side of the air valve, whilst the underside is exposed in a chamber 18 subjected to a higher pressure. Fuel is supplied to the induction passage through a jet 19 in the bridge 13, controlled by a needle 20 moving with the air valve, and mixes with the air in a mixing chamber 11b constituted by the part of the induction passage 11 downstream of the air valve 12 and upstream of a throttle valve 21, mounted in the induction passage 11, which controls the flow of fuel-air mixture into a conduit 22 of relatively large cross-section leading to an induction manifold 23.

A conduit 24, of relatively small cross section, branches from the induction passage 11 upstream of the throttle valve 21 and returns to the manifold 23, downstream of the throttle valve 21, and a heating device 25, for example a chamber surrounded by a heating jacket coupled to the exhaust system of the engine, surrounds the conduit 24. Another throttle valve 26 is mounted in the conduit 24 adjacent its junction with the mixture passage 11.

The part of the mixture passage 11 in which the throttle valve 21 is mounted may be formed in the carburetter body itself or in a unit secured thereto but forming part of the carburetter assembly. Similarly the throttle valve 26 may be mounted in the carburetter body itself or in a tubular unit secured thereto.

The part of the induction passage 11 downstream of the air valve 12 and upstream of the point at which the conduit 24 branches therefrom, the conduit 24 itself, and the induction manifold 23, constitute the primary induction conduit system, the part of the conduit 22 between the points at which the conduit 24 branches from and returns thereto constituting the by-pass.

The two throttle valves 21 and 26 are coupled by a suitable linkage to a driver's throttle control such as the conventional throttle pedal in such a way that the throttle valve 26 is directly operated by the said linkage, whereas the throttle valve 21 is controlled through a lost motion connection so that it commences to open only when the throttle valve 26 is already open to a substantial extent.

The throttle valves 21 and 26 are carried respectively on spindles 27 and 28, as shown in FIGURE 1. As shown in FIGURE 5, the spindle 28 which carries the throttle valve 26 has fixed to it an arm 29 on the end of which is provided a lug 31 which engages in an arcuate slot 32 in a lever member 33 freely rotatable on the spindle 28, the lever member 33 carrying a pin 34 engaging in a longitudinal slot 35 in an arm 36 fixed to the spindle 27 of the throttle valve 21. The spindle 28 is rotated by movement of the conventional linkage, (not shown) which may act on an arm fixed to the opposite end of the said spindle 28. A further arm 37 also fixed on the spindle 28 co-operates with an adjustable screw stop 38 to enable the position of the throttle valve 26 to be set for normal idling, the said arm also carrying a screw stop 39 cooperating with a cam 40 associated with a starting device (not shown) to provide a fast idle position for use when the engine is cold. A tension spring 41 attached at one end to the lever member 33 and at the other end to an anchorage on the carburetter body acts through the pin 34 and arm 26 to urge the throttle valve 21 towards the closed position.

The arcuate slot 32 is of such a length that the lug 31 which, when the throttle valve 26 is closed, is in the position shown in FIGURE 5, reaches the other end of the said slot only when the throttle valve 26 is approaching its fully open position. Thus, only during the last small part of the movement of the throttle valve 26 towards the open position is the throttle valve 21 opened, and its rate of opening movement is substantially greater than the rate of opening movement of the throttle valve 26, owing to the fact that the radial distance of the pin 34 from the centre of the spindle 28 is substantially greater than the distance between the centre of the spindle 27 and the point at which the pin 34 engages the arm 36.

It will be seen that the sequence of events when the driver's throttle control is moved from the throttle-closed position is as follows. The throttle valve 26 is first opened progressively, allowing fuel-air mixture to flow only through the conduit 24 of smaller cross section, and only when this throttle valve 26 is substantially fully open does the throttle valve 21 commence to open and allow flow of fuel-air mixture through the conduit 22 of larger cross section.

Mixture is therefore supplied through the primary conduit system for idling and general operation of the engine, whereas mixture is supplied through the secondary conduit system only for operation of the engine at high or maximum power.

The relative movements of the throttle valves 21 and 26 may be so arranged that both reach their fully open positions simultaneously, but the throttle valve 26 may be arranged to move beyond its fully open position during the opening of the throttle valve 21, so as to reduce the flow of fuel/air mixture through the conduit 24.

As shown in FIGURE 2, the two throttle valves may be both mounted in the conduit 22 of larger cross section, one throttle valve 38, which controls the flow of fuel-air mixture in the conduit 24 of smaller cross section being mounted upstream of the point at which that conduit branches from the conduit 22, and the other throttle valve 39, which controls the flow of fuel-air mixture in the conduit 22 being mounted between the points at which the conduit 24 leaves and returns to the conduit 22.

It is desirable that the part of the primary conduit system constituted by the conduits of smaller cross-section shall extend as near as possible to the inlet ports of the engine cylinders, and, with the arrangements of throttle valves shown in FIGURES 1 and 2, the conduit 24 may be branched downstream of the heating device 25, the branches leading into an inlet manifold, coupled to the conduit 22, either adjacent the connections of the manifold branches to the individual cylinders of the engine or at points such that each branch of the conduit 24 serves two or more cylinders.

Other possible arrangements of the throttle valves are shown in FIGURES 3 and 4. In FIGURE 3, as in FIGURE 2, both throttle valves are arranged in the conduit 22 of larger cross-section, but the throttle valve 38, which controls the flow of fuel-air mixture in the conduit 24, is positioned downstream of the point at which that conduit 24 returns to the conduit 22. In FIGURE 4, the throttle valve 41 which controls the flow of fuel-air mixture in the conduit 24 is arranged in that conduit downstream of the heating device 25, the throttle valve 21, which controls the flow of fuel-air mixture in the conduit 22 being arranged as in FIGURE 1.

Using the arrangements of FIGURES 2 and 3 the throttle valve 38 must not move beyond its fully open position.

The use of the primary conduit system of relatively small cross-section, due to the fact that it increases the velocity of the fuel-air mixture, reduces the tendency for liquid fuel to be deposited in the said system, and therefore reduces the variations in the fuel-air ratio in the mixture supplied to the engine cylinders. The heating device, if provided, assists the vapourisation of the fuel and further reduces the tendency for it to be deposited in the conduit system.

The primary conduit system produces a relatively high pressure loss and, if a heating device is employed, provides a considerable heat input, both of which would have a deleterious effect on the output of the engine. However, the provision for bringing into use the secondary conduit system at large throttle openings enables the primary conduit system to be by-passed when a high power output is required, thus permitting the engine to produce its normal maximum output. Thus in urban areas, where speeds are limited and the emission of toxic gases is most serious, only the primary conduit system is normally in operation, the throttle valves being coupled in such a way that the secondary conduit system begins to come into use at, for example, about 60 m.p.h.

Figure 6:
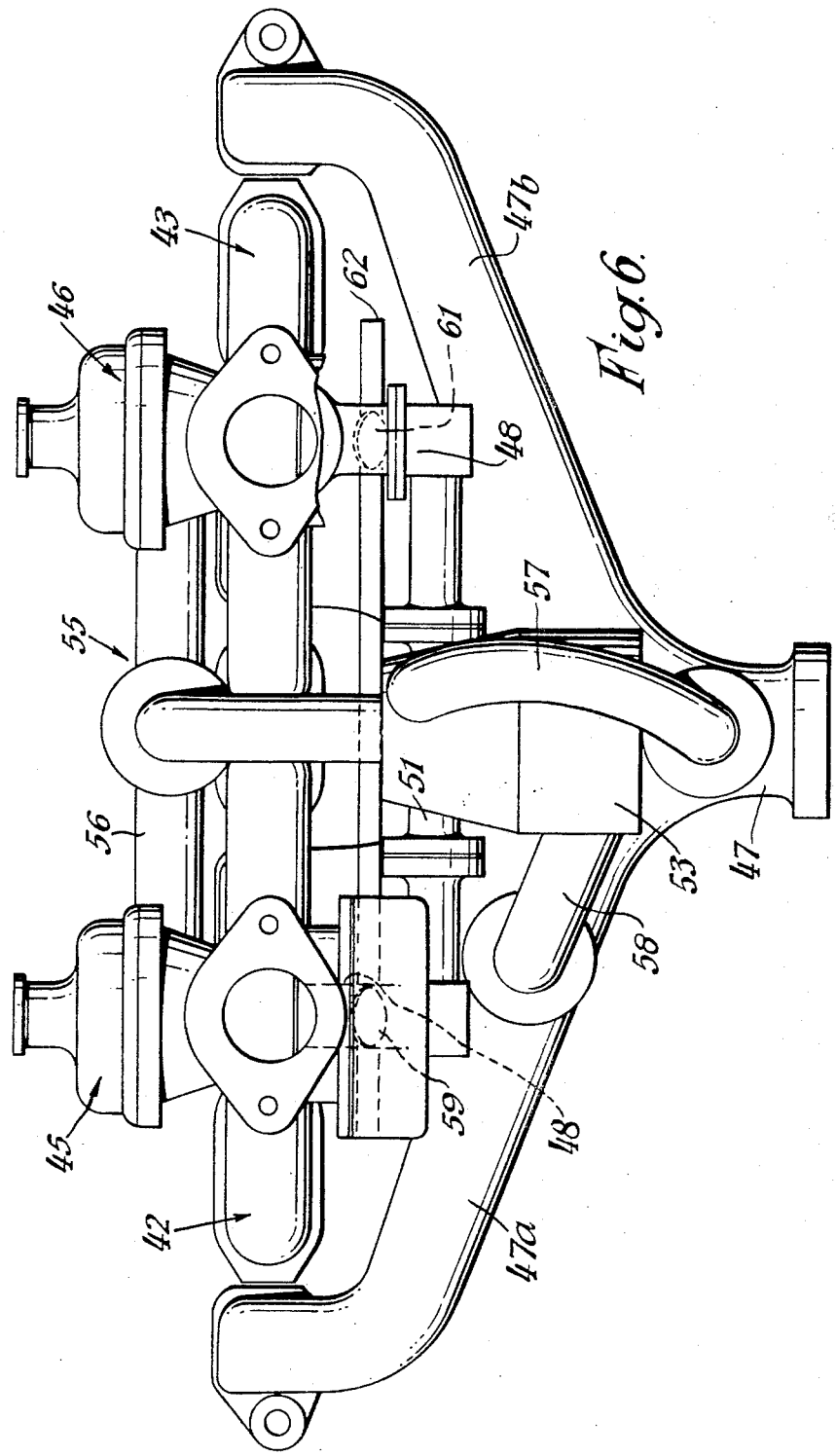
FIGURE 6 is a side elevation of a fuel-air supply and intake system according to the invention for a four-cylinder internal combustion engine, which system includes two air-valve carburetters.
Figure 7:
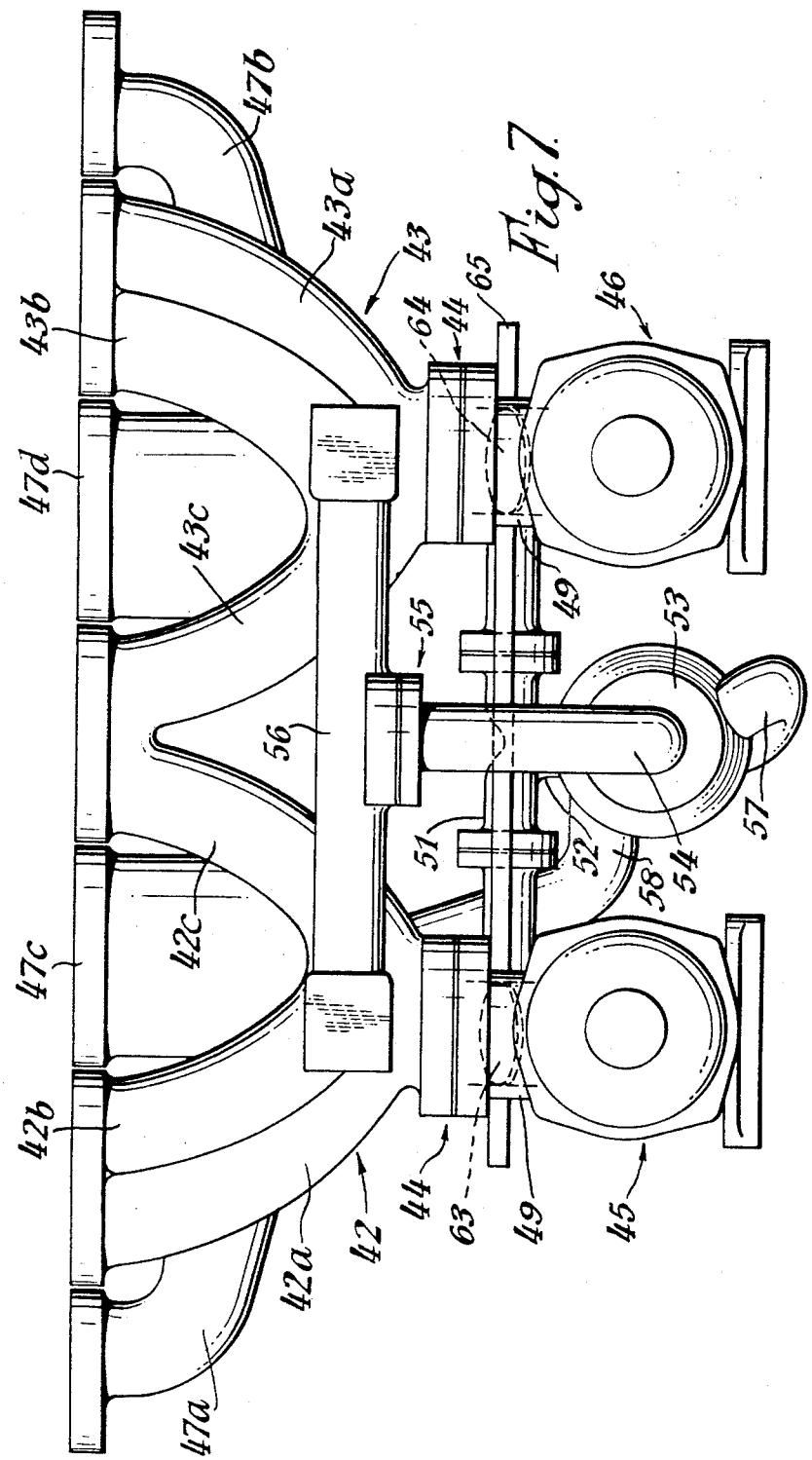
FIGURE 7 is a plan view of the fuel-air supply and intake system shown in FIGURE 6.

The air-fuel supply and intake system according to the invention may include two or more carburetters, and FIGURES 6 and 7 of the drawings show, by way of example, a system in which two carburetters are employed with an engine having six cylinders.

Referring to FIGURES 6 and 7, an inlet manifold comprises two units 42 and 43 each serving three cylinders of the engine (not shown), each unit 42 and 43 having a mounting at 44 for one of two air-valve carburetters 45 and 46, and comprising three branches 42a, 42b, 42c and 43a, 43b, 43c each leading to the inlet port of one cylinder of the engine. An exhaust manifold 47 is provided having branches 47a and 47b for connection to the exhaust ports of the two end cylinders of the engine and branches 47c and 47d for connection each to the exhaust ports of a pair of intermediate cylinders. Passages 48 in the carburetter bodies branch from the induction passages 49 in the said bodies near the ends of said induction passages which are connected to the inlet manifold units 42 and 43 and are connected one to the other by a conduit 51 from which a branch 52 leads into a jacketed chamber 53. A further conduit 54 leads from the chamber 53 to a T-junction at 55 with a further conduit 56 connected at its ends respectively to the inlet manifold units 42 and 43 at the junction of the branches thereof. The jacket of the chamber 53 is connected by pipes 57 and 58 to spaced points in the exhaust manifold 47, so that exhaust gases pass through the said jacket when the engine is in operation, to heat the said chamber.

The induction passages 49 of the carburetters upstream of the branch passages 48, the branch passages 48 themselves, the conduits 51, 52, 54 and 56, and the branches of the inlet manifold units constitute the primary conduit system, the secondary conduit system consisting of the parts of the carburetter induction passages downstream of the branch passages 48, and the portions of the inlet manifold units 42 and 43 adjacent the carburetter mountings 44.

The branch passages 48 and conduits 51, 52, 54 and 56 are of smaller cross-sectional area than the induction passages 49 and the inlet manifold branches.

Primary throttle valves 59 and 61 are provided in the branch passages 48 and are connected together by a spindle 62 (FIGURE 6).

Secondary throttle valves 63 and 64, shown in dotted lines in FIGURE 7, are provided in the induction passages of the carburetters 45 and 46 downstream of the branches of the passages 48 therefrom, and are connected together by a spindle 65. The spindle 62 is coupled to a driver's accelerator pedal or equivalent control member, and is linked, with lost motion, to the spindle 65 as described with reference to FIGURE 5.

Since the primary conduit system includes conduits 52 and 54 and the chamber 53, and the fuel/air mixture from both carburetters is brought together in these conduits and chamber and then re-distributed to the engine cylinders, the balancing of the distribution of the fuel/air mixture to the engine cylinders is greatly improved.

By employing a dual manifold system which draws fuel from a common carburetter or carburetters the problem of flooding due to dribbling from fuel valves controlling the float chamber level, which would arise if separate carburetters were used for supplying the primary and secondary manifold systems respectively is avoided, and there are no difficulties with progression whilst the secondary throttle valve or valves is or are opening or closing.

I claim:

1. In a mixture supply and intake system for an internal combustion engine comprising a charge forming device, a primary induction conduit system and a secondary induction conduit system both receiving fuel/air mixture from said charge forming device and passing said mixture to an intake manifold of said engine, primary throttle valve means for controlling said primary induction conduit system, secondary throttle valve means for controlling said secondary induction conduit system and means for opening in succession said primary and secondary throttle valve means, wherein the improvement comprises said charge forming device having an induction passage, a suction-operated air valve mounted in said induction passage, a mixing chamber constituted by the part of said induction passage between the air valve and the throtle valves, said air valve being operative to maintain an effective suction in said mixing chamber under all operating conditions, and fuel supply means including a fuel inlet orifice leading into the induction passage and means operatively connected to said air valve to cooperate with the fuel inlet orifice and vary the fuel flow with the position of the air valve, so that the fuel supply varies with the air flow.

2. A mixture supply and intake system according to claim 1 wherein the means for successively opening the primary and secondary throttle valve means comprises lost motion linkage means operatively connected in such a way that the primary throttle valve means opens first and the secondary throttle valve means commences to open when the primary throttle valve means is sufficiently open not to restrict the flow therethrough.

3. A mixture supply and intake system according to claim 1, wherein the primary induction conduit system compirses conduits of smaller total cross sectional area than the conduits of the secondary induction conduit system, which conduits of smaller cross-section are by-passed by said secondary induction conduit system.

4. A mixture supply and intake system according to claim 3, wherein the primary throttle valve is mounted in the primary induction conduit system downstream of the part of said primary induction conduit system which is by-passed by the secondary induction conduit system, and the secondary throttle valve means is mounted in the secondary induction conduit system.

5. A mixture supply and intake system according to claim 3 further comprising a heating means mounted in that part of the primary induction conduit system which is bypassed by the secondary induction conduit system.

6. A mixture supply and intake system according to claim 5, wherein the primary throttle valve means is mounted upstream of the heating device.

7. A mixture supply and intake system according to claim 5, wherein the primary throttle valve means is mounted downstream of the heating device.

8. A mixture supply and intake system according to claim 1, wherein the primary throttle valve means is so positioned in the primary induction conduit system that it is by-passed by the secondary induction conduit system, and the secondary throttle valve means is mounted in the secondary induction conduit system.

9. A mixture supply and intake system according to claim 1, wherein the primary throtle valve means is mounted in the primary induction conduit system upstream of the commencement of the secondary induction conduit system, and the secondary throttle valve means is mounted in the second-secondary induction conduit system.

10. A mixture supply and intake system according to claim 1 for a multi-cylinder internal combustion engine comprising at least two carburetors, at least two inlet manifold units each connected to one of said carburetors and serving to supply air-fuel mixture from that carburetor to at least one cylinder of the engine, a conduit interconnecting the induction passages of said carburetors and a plurality of additional conduits providing connections between said connecting conduit and the inlet manifold units, said connecting conduit and additional conduits constituting the part of the primary conduit system by-passed by the secondary conduit system.

11. A mixture supply and intake system according to claim 10, wherein a single conduit leading from the connecting conduit is branched to provide the additional conduits, the single conduit being provided with a heating device.

12. A mixture supply and intake system according to claim 10, wherein a primary throttle valve is provided for each carburetor in the part of said connecting conduit adjacent to the mixture passage of said carburetor, and a secondary throttle valve is provided in the induction passage of each carburetor downstream of the point at which the connecting conduit is connected to the said induction passage.

References Cited

UNITED STATES PATENTS

| | | |
|---|---|---|
| 1,304,449 | 5/1919 | Brush _____ 261—144 XR |
| 1,767,031 | 6/1930 | Worthington. |
| 2,730,091 | 1/1956 | Burrell. |
| 2,832,328 | 4/1958 | Haigh et al. |
| 3,338,568 | 8/1967 | Mangoletsi. |

JULIUS E. WEST, *Primary Examiner.*

U.S. Cl. X.R.

123—52, 119, 127; 261—144, 145